(12) United States Patent
Klinefelter et al.

(10) Patent No.: US 6,264,296 B1
(45) Date of Patent: *Jul. 24, 2001

(54) INK JET IDENTIFICATION CARD PRINTER WITH LAMINATION STATION

(75) Inventors: Gary M. Klinefelter, Eden Prairie; Erick Hagstrom, Hamel; Robert P. Cummins, Deephaven, all of MN (US)

(73) Assignee: Fargo Electronics, Inc., Eden Prairie, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,455

(22) Filed: Oct. 23, 1998

Related U.S. Application Data

(63) Continuation-in-part of application No. 09/128,316, filed on Aug. 3, 1998, now Pat. No. 6,022,429, and a continuation-in-part of application No. 08/854,969, filed on May 13, 1997, now Pat. No. 5,941,522, and a continuation of application No. 08/851,637, filed on May 6, 1997, now Pat. No. 5,807,461

(60) Provisional application No. 60/063,043, filed on Oct. 24, 1997.

(51) Int. Cl.[7] .................................................. B41J 3/00
(52) U.S. Cl. ....................................................... 347/4
(58) Field of Search ........................... 347/4, 2; 156/384, 156/387; 235/488; 271/291; 399/342; 283/107, 109, 110, 111; 346/135.1

(56) References Cited

U.S. PATENT DOCUMENTS

| | | | |
|---|---|---|---|
| 3,889,472 | 6/1975 | Guillaud | 60/698 |
| 3,960,072 | 6/1976 | Ahlgren et al. | 101/35 |
| 4,068,028 | 1/1978 | Samonides | 428/40 |
| 4,146,900 | 3/1979 | Arnold | 346/75 |
| 4,393,386 | 7/1983 | Di Giullo | 346/75 |
| 4,534,313 | 8/1985 | Louvel | 118/696 |
| 4,604,631 | 8/1986 | Jinnai et al. | 346/1.1 |
| 4,680,596 | 7/1987 | Logan | 346/140 |
| 4,685,702 | 8/1987 | Kazuharu | 283/81 |
| 4,686,540 | 8/1987 | Leslie et al. | 346/33 |
| 4,716,346 | 12/1987 | Matsuo | 318/38 |
| 4,734,868 | 3/1988 | DeLacy | 364/519 |
| 4,781,985 | 11/1988 | Desjarlais | 428/421 |
| 5,161,233 | 11/1992 | Matsuo et al. | 355/77 |
| 5,277,501 | 1/1994 | Tanaka et al. | 400/120 |
| 5,327,201 | 7/1994 | Coleman et al. | 355/278 |
| 5,368,677 | 11/1994 | Ueda et al. | 156/362 |
| 5,466,319 | 11/1995 | Zager et al. | 156/220 |
| 5,516,218 | 5/1996 | Amano et al. | 400/535 |
| 5,646,388 | 7/1997 | D'Entremont et al. | 235/380 |
| 5,695,589 | 12/1997 | German et al. | 156/250 |
| 5,709,484 | 1/1998 | Dorner | 400/188 |
| 5,807,461 | * 9/1998 | Hagstrom | 156/361 |
| 5,837,991 | 11/1998 | LaManna et al. | 235/475 |
| 5,941,522 | * 8/1999 | Hagstrom et al. | 156/361 |
| 6,033,832 | * 3/2000 | Windgender | 430/373 |

FOREIGN PATENT DOCUMENTS

| | | |
|---|---|---|
| 25 35 699 A1 | 3/1977 | (DE). |
| 2 120 821 | 12/1983 | (GB). |
| WO 95/09084 | 4/1995 | (WO). |

\* cited by examiner

*Primary Examiner*—John Barlow
*Assistant Examiner*—Michael S. Brooke
(74) *Attorney, Agent, or Firm*—Westman, Champlin & Kelly, P.A.

(57) ABSTRACT

An identification card printer is adapted to receive a supply of identification cards and print material onto the cards sequentially. A lamination station is provided for laminating over the ink jet printing to protect the printing on the printed card from the environment.

17 Claims, 1 Drawing Sheet

INK JET IDENTIFICATION CARD PRINTER WITH LAMINATION STATION

The present invention claims priority to Provisional Application Ser. 60/063,043, filed Oct. 24, 1997 and entitled INK JET IDENTIFICATION CARD PRINTER WITH LAMINATION STATION and is a Continuation-In-Part of Ser. No. 08/854,969 filed May 13, 1997 is now U.S. Pat. No. 5,941,522, issued Aug. 24, 1999, and Ser. No. 08/128,316 filed Aug. 3, 1998 now U.S. Pat. No. 6,022,429, issued Feb. 8, 2000 which itself is a continuation of Ser. No. 08/851,637 filed May 6, 1997 is now U.S. Pat. No. 5,807,461, issued Sep. 15, 1998.

BACKGROUND OF THE INVENTION

The present invention relates to ink jet printers. More specifically, the invention relates to an ink jet printer for printing onto an identification card which includes a lamination station for laminating the identification card.

Identification cards are widely used to carry information relating to the card holder, for example. The use of such identification cards is becoming more and more widespread and they are used for many purposes, such as driver licenses, identification badges, etc. In the past, identification cards have been manufactured using a labor intensive process in which an individual's data was manually stamped or imprinted onto a card. Additionally, in some cases an instant photograph was taken of the subject and adhered or laminated to a card. However, with the advent of computers, manufacturing of identification cards has become increasingly automated. An individual's data may be obtained from a computer database and formatted by the computer. The formatted information is then provided to a special printer for printing onto the identification card. Subsequently, the identification card may be laminated to protect the printed information.

This prior art automated identification card printing technique has worked well for large scale operations which can justify the expense of an expensive identification card printer. Such printers may include, for example, a dye sublimation type printer. For example, the Persona® identification card printer available from Fargo Electronics, Inc. of Eden Prairie, Minnesota is an example of one type of dye sublimation identification card printer. Further, for longer wear and security, the printed card may be subsequently laminated.

However, as computer systems have become less expensive, the expense of identification card printers has prevented the use of identification cards from finding even more widespread use, particularly in small operations or in implementations having a limited budget. In such situations, if identification cards are required, an expensive identification card printer must be obtained which is more suitable for large scale operations. If this is not possible, a simple, rudimentary prior art identification card impression device must be obtained. Such a device is very limited in its versatility. Alternatively, the identification card must be written out by hand on cardboard, for example, and placed into a plastic sleeve.

None of these solutions are particularly attractive and have left the small user with only limited identification card printing options. Furthermore, it would also be desirable for large scale users to utilize less expensive identification card printers thereby increasing their cost savings as well.

SUMMARY OF THE INVENTION

An identification card printer is adapted to receive a supply of identification cards. The ink jet printer for printing material on the cards sequentially, and a lamination station for providing a cover laminated over the ink jet printing to protect the printing on the printed card from the environment (i.e., light, water, chemical, abrasion).

DETAILED DESCRIPTION OF THE PREFERRED EMBODIMENTS

Figure 1:
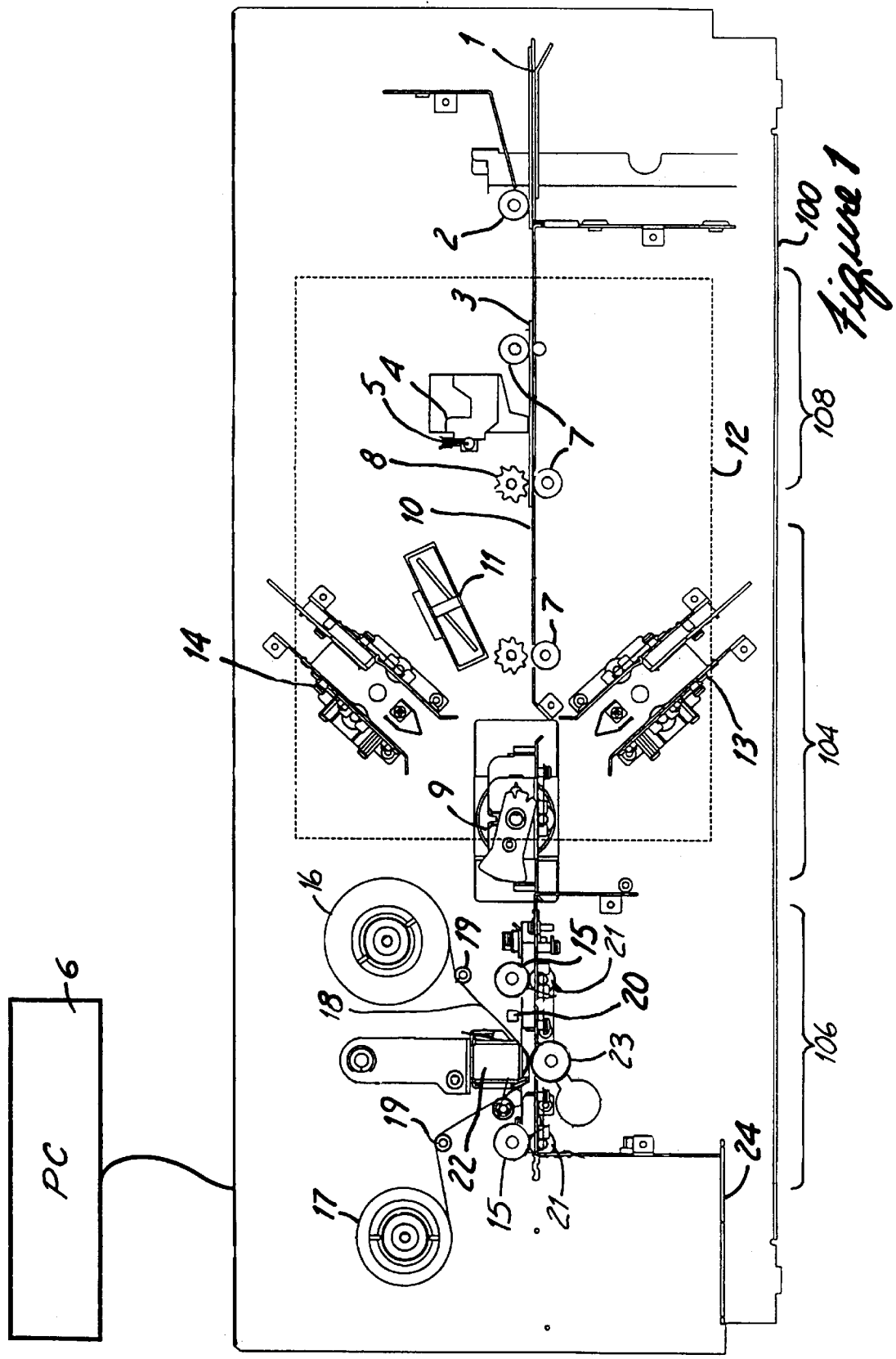
FIG. 1 is a simplified cross-sectional view of an identification card printer in accordance with one embodiment of the present invention.

The present invention provides a low cost, high quality printer for printing identification cards. In the present invention, an ink jet printer is used to perform the printing function. Ink jet printers are relatively fast, reliable and relatively inexpensive to produce. However, the prior art has largely failed in its attempts to provide such an identification card printer. The present invention is well suited for low volume identification card production. However, cost savings can be obtained in high volume installations as well. The printer may be coupled to a computer whereby identification cards are inexpensively produced. Further, the production of such cards can be on an as needed basis in which cards are printed on demand and can be immediately put into use. For example, the printer of the present invention could be used to produce identification badges at a guard desk at the entrance to an industrial facility. Further, in the prior art, most inexpensive identification card printers have required a separate laminating step or the cards have been required to be carried in transparent, waterproof pouches and are sensitive to light, water, chemical or physical abrasion.

FIG. 1 is a simplified side cross-sectional view of an ink jet identification card printer with a lamination station 100 in accordance with one embodiment of the present invention. Printer 100 may be divided into three general areas, printing station 102, intermediary station 104 and laminating station 106. Printer 100 is shown coupled to a controller, such as a personal computer 6 which is used to provide information for printing onto an identification card 3 and controlling operation of printer 100. Additionally, an internal circuit board 12 provides internal control of operation of printer 100.

Printer 100 includes an input hopper 1 which is adapted for receiving an identification card. One such card is the UltraCard 3 coated with the invention described in ink jet printable surface commonly called "Tuff-Coat"™ in the trade available from Fargo Electronics, Inc. of Eden Prairie, Minnesota. However, other types of identification cards may be used. In one preferred embodiment, the identification card 3 comprises a substrate of teslin. In another embodiment, a thick paper stock is used. An input roller 2 moves the identification card 3 from input hopper 1 along an identification card path toward ink jet print head 4. Ink jet print head 4 may comprise any type of ink jet print head and may optionally include an ink jet ink cartridge for supplying ink jet ink. Print head 4 moves along a rod 5 in a direction generally perpendicular to the direction of the path followed by identification card 3. Identification card 3 is held in place and moved past print head 4 using pinch or drive rollers 7 and star roller 8. Star roller 8 has a plurality of ridges adapted to secure card 3 and maintain registration of card 3 relative to print head 4. However, in another embodiment, a circular roller is used which has a substantially circular outer circumference. A position sensor (not shown) may also be provided such that the location of card 3 can be monitored as card 3 moves along the card path through printer 100. After printing, card 3 moves out of printing station 102 and into intermediary station 104.

Following printing, and before entry into intermediary station 104, card 3 is moved through drying/holding area 10 and a fan 11 produces an air flow directed toward card 3. This allows ink from the ink jet print head 4 to dry on card 3. Another pinch roller 7 and star roller 8 move card 3 into intermediary station 104 and into a flipping device 9.

Flipping device 9 rotates about its axis such that card 3 may be selectively moved down into a magnetic card encoder 13 and/or up into a smart card encoder 14. Encoders 13 and 14 draw card 3 inward and include data encoder such that additional data may be encoded onto card 3. Stations other than smart card and magnetic card encoders may be provided. Further, flipper 9 may move card 3 between additional stations as desired. Following the encoding process, flipper 9 moves card 3 out of intermediary station 104 and into laminating station 106.

Laminating station 106 includes transport rollers 15 which are used to move card 3 therethrough. A laminate material 18 is moved between a supply roll 16 and a take up roll 17 past rollers 19 and heater 22. In one preferred embodiment, laminate material 18 comprises thermal transfer over laminate film available from Fargo Electronics, Inc. A platen 23 is provided to press card 3 against heater 22. Heater 22 includes an actuator (not shown) to press laminate material 18 against card 3. Pinch rollers 21 are provided opposite transport rollers 15 and used to secure card 3 and maintain registration of card 3 during the lamination process. In one embodiment, laminate material 18 comprises a plurality of individual laminates carried on a web. A sensor 20 is provided to sense the position of the individual laminates carried on web 18. Operation of laminating station 106 may be in accordance with that described in U.S. Pat. No. 5,807,461, entitled LAMINATION TECHNIQUE which issued Sep. 15, 1998 and is incorporated herein by reference.

In one aspect of the present invention, card 3 may be moved back into flipper 12 and the card rotated 180°. This allows both sides of card 3 to be laminated with laminate material 18. Double sided lamination is particularly advantageous with the identification card is made of thin flexible material such as paper, because the extra lamination adds strength to the card. Further, those skilled in the art will recognize that through the use of flipper 12, information may be printed onto both sides of the card 3 using print head 4, or data may be recorded on both sides of card 3 using encoders 13 and 14.

After the printing and lamination process is complete, card 3 is moved to output hopper 14. In some embodiments, multiple cards may be processed simultaneously with the various cards positioned at various locations within printer 100. Typically, printer 100 is controlled by circuitry on circuit board 12 in accordance with instructions from PC 6. However, such control can be exclusively with printer 100, exclusively within PC 6, or shared therebetween.

In one embodiment, flipping mechanism 9 operates in a manner similar to that disclosed in U.S. patent application Ser. No. 08/854,969, entitled PRINTER WITH AUXILIARY OPERATION which was filed May 13, 1997 which is incorporated herein by reference.

Although the present invention has been described with reference to preferred embodiments, workers skilled in the art will recognize that changes may be made in form and detail without departing from the spirit and scope of the invention.

What is claimed is:

1. An identification card printer and laminator system, comprising:
    an identification card supply configured to hold a stack of individual identification cards;
    a first roller configured to transport an identification card along a printing path;
    an ink jet printhead positioned in the printing path and configured to move in a direction perpendicular to a direction of the printing path, the ink jet printhead further configured to print on a surface of the identification card with an aqueous ink;
    a second roller configured to transport the identification card from the ink jet printhead through an intermediary station of the system;
    a lamination station positioned to receive a printed identification card from the intermediary station, the laminator configured to laminate a printed identification card with an individual laminate carried on a web; and
    a single housing enclosing the first roller, the ink jet printhead, the second roller, the intermediary station and the lamination station.

2. The identification card printer and laminator system of claim 1 wherein the intermediate station located between the ink jet printer and the lamination station is configured to add additional data to the card prior to lamination.

3. The identification card printer and laminator system of claim 1 including a flipping mechanism in the intermediary station between the ink jet printer and the lamination station for selectively rotating an identification card.

4. The identification card printer and laminator system of claim 3 including a data encoder in the intermediary station configured to record data onto an identification card and wherein the flipping mechanism is configured to move the printed identification card into the data encoder.

5. The identification card printer and laminator system of claim 3 wherein the lamination station laminates a first side of the identification card and the flipping mechanism is configured to flip the identification card to laminate a second side of the identification card.

6. The identification card printer and laminator system of claim 5 wherein the identification card comprises paper stock.

7. The identification card printer and laminator system of claim 3 wherein the flipping mechanism is positioned to flip the identification card such that the ink jet printer may subsequently print on a second side of the identification card.

8. The identification card printer and laminator system of claim 3 including a plurality of intermediary stations proximate the flipping mechanism and wherein the flipping mechanism is configured to direct the printed identification card into each of the intermediary stations.

9. The identification card printer and laminator system of claim 1 including a drying area located in the intermediary station between the ink jet printer and the lamination station, wherein the drying area is configured to temporarily hold a printed identification card to thereby allow printed ink to dry thereon.

10. The identification card printer and laminator system of claim 9 including a fan directed toward the drying area.

11. The identification card printer and laminator system of claim 1 including a sensor configured to sense position of the individual laminates carried on the web.

12. The identification card printer and laminator system of claim 1 including an input hopper configured to carry the stack of identification cards.

13. The identification card printer and laminator system of claim 1 including an output hopper configured to carry a plurality of identification cards.

14. The identification card printer and laminator system of claim 1 including a data encoder in the intermediary station configured to record data onto the identification card.

15. The identification card printer and laminator system of claim 14 wherein the data encoder comprises a magnetic recording element configured to record data onto a magnetic strip carried on the identification card.

16. The identification card printer and laminator system of claim 1 wherein the ink jet printer includes an ink jet print head adapted to move in a direction substantially perpendicular to a direction of movement of the identification card past the printer.

17. An identification card printer and laminator system comprising a supply of identification cards, an ink jet printer having an ink jet printhead to print ink jet ink on the cards sequentially, and a lamination station to adhere a cover laminated over a printed card to protect the ink jet ink on the printed card from the environment, the ink jet printer and the laminator contained within a single housing, a flipping mechanism positioned between the ink jet printer and the lamination station for selectively rotating an identification card, wherein the lamination station laminates a first side of the identification card and the flipping mechanism is configured to flip the identification card whereby the lamination station subsequently laminates a second side of the identification card.

* * * * *

UNITED STATES PATENT AND TRADEMARK OFFICE
CERTIFICATE OF CORRECTION

PATENT NO.   : 6,264,296 B1
DATED        : July 24, 2001
INVENTOR(S)  : Gary M. Klinefelter et al.

It is certified that error appears in the above-identified patent and that said Letters Patent is hereby corrected as shown below:

<u>Column 5,</u>
Delete claim 16.

Signed and Sealed this

Twenty-third Day of July, 2002

*Attest:*

*Attesting Officer*

JAMES E. ROGAN
*Director of the United States Patent and Trademark Office*